UNITED STATES PATENT OFFICE

1,937,043

ABRASIVE ARTICLES AND SOLIDS OF LIKE CONSTITUTION

Harry C. Martin, Niagara Falls, N. Y., assignor to The Carborundum Company, Niagara Falls, N. Y., a corporation of Pennsylvania No Drawing. Application July 1, 1931, Serial No. 548,263, and in Canada April 29, 1929

5 Claims.  (Cl. 51—278)

This application is a continuation in part of my previously filed and copending applications, Serial No. 295,122 and Serial No. 471,886.

This invention relates to an improvement in the manufacture of abrasive articles, consisting of mineral granules such as silica, garnet, silicon carbide, fused alumina, fused magnesia, fused aluminum silicate, glass, or other natural or artificial mineral substances bonded by means of a synthetic resin such as phenolic condensation resins sold under the trade names of "Redmanol" and "Bakelite".

A method of coating silicon carbide grains with the resin has been described by the applicant in a prior application which has become United States Patent No. 1,576,440. In the example given in that patent, furfural was used as a coating solution for silicon carbide grains in the proportion of 20 cubic centimeters of liquid to 1000 grams of solid granular material. The phenolic resin was then added in powdered form, the resin constituting 3 to 12 per cent by weight of the mixture (depending upon characteristics of the article described). Another example is given in United States patent, No. 1,626,246 also granted to me.

In the application of this process to the manufacture of abrasive wheels and other solids where great strength and uniformity of structure are required, it has been found a great advantage to limit the atmosphere surrounding the mixing operation to a temperature below that at which the resin begins to soften and to an absolute humidity below that at which the resin takes up water to the extent of forming lumps. In this way the mixture itself may easily be kept from becoming unworkable during the manufacturing process.

The upper limit of temperature of the mixture varies with different resins, but is at approximately 80° Fahr. for phenolic condensation resins. A strong bond is obtained under proper temperature conditions when the mixture is made in the proportions of 900 grams of abrasive, 100 grams of resin, and 10 cubic centimeters of furfural. The abrasive grains are first wet with furfural, the amount of the latter being brought up to the proportion given. The solid phenolic condensation resin is then added in powdered form. If the temperature of the mixture is at a temperature of about 70° Fahrenheit, the abrasive grains coated with furfural (in which enough of the solid resin has dissolved to make the coating sticky), attach some of the powdered resin to themselves. In this condition the coated grains can roll over each other and a very uniform mix may be obtained.

On the contrary, I have found that as the temperature of the mixture rises about 70° Fahr., the mix becomes more and more unworkable. This effect is partly due to the softening of the powdered resin by contact with the furfural and partly due to the effect of the atmosphere upon the phenolic condensation product per se. The powdered resin therefore becomes so gummy that proper mixing becomes impossible. Aggregations of abrasive grains take place as well as aggregations of resin. These aggregations cause irregular cutting conditions and irregular strength conditions. There is "streakiness" in the abrasive article.

When the temperature is below the critical point, and the resin has not been exposed to an atmosphere above a critical moisture content, the grains will be uniformly distributed throughout the mix and each abrasive grain will be thoroughly coated with furfural and resin dissolved by the latter. The liquid coating causes the powdered resin to adhere to and uniformly coat the abrasive grains and thus enables the grains to assume very uniform spacing under favorable mixing conditions.

If the amount of furfural is diminished to take care of the effects of temperatures higher than the critical temperature limits given above, the abrasive grains will tend to fall to the bottom of the mold. This will make one side of the abrasive article of different cutting qualities from the other. The finished article will be streaky. It will be more liable to break than the uniform article which is desired and whose constitution is referred to above. This method also tends to form an unbalanced wheel, for example.

In the process as hitherto described, the temperature of the mixture and the temperature of the atmosphere do not differ appreciably. The materials which are used in the mixture are usually kept stored in the mixing room and in any case are long enough in the mixing room before being placed in the mixer to bring their temperature up to that of the room. The work of mixing is not sufficient to raise the temperature of the mixture more than a fraction of a degree Fahr.

It is within the scope of my invention however to keep the temperature of the mixture below the critical temperature by water-jacketing the mixer, for example. Any method that will maintain the temperature of the mixture below its critical temperature (without altering the constituents of the mixture and interfering with the thoroughness of the mixing) will suffice. Keeping the atmosphere of the mixing room below the critical temperature is generally the simplest method of conditioning the mixture.

In order to overcome the disadvantages that result from non-uniform mixtures of grain and bond, I also limit the maximum humidity of the atmosphere to which the powdered resin is exposed at any time during the process of manufacture of the abrasive articles prior to molding.

In the case of phenol-formaldehyde condensation product resins, I control the humidity of the air so that there are less than about 80 grains of water per pound of dry air. Other materials, being more or less hygroscopic than phenol-formaldehyde resins, can be exposed to atmospheres of lower or higher humidity and I therefore do not wish to limit my invention to the particular humidity given in the present example.

The permissible relative humidity of the atmosphere depends on the temperature in the following manner if, as in the case of phenol-formaldehyde resins mentioned in the specific example above, 80 grains of water per pound of dry air are taken as the upper limit.

| Temperature of mixing room | Permissible relative humidity |
|---|---|
| ° Fahr. | Percent |
| 61 | 100 |
| 64 | 90 |
| 67 | 80 |
| 72 | 70 |
| 76 | 60 |
| 82 | 50 |
| 88 | 40 |
| 97 | 30 |

Where the absolute humidity of the atmosphere is less than 80 grains of water per pound of dry air, it is sufficient to keep the temperature of the mixing room below 80° Fahr. in order to obtain satisfactory conditions for a uniform mixing of the resin and abrasive grains coated with resin solvent.

The following table illustrates the effect of the humidity of the atmosphere of the mixing room on the workability of a mix of abrasive grains, phenol condensation product resin and plasticizer which has been taken as the example.

| Temperature | Relative humidity | Grains water per pound dry air | Percent moisture absorbed by resin | Workability of mix |
|---|---|---|---|---|
| ° Fahr. | Percent | | | |
| 70 | 50 | 55 | .776 | Good. |
| 70 | 60 | 65 | .97 | Good. |
| 70 | 70 | 75 | 1.25 | Stuck together in a mass if left too long. |
| 70 | 80 | 86 | 2.04 | Stuck together in a hard mass. |
| 70 | 90 | .99 | 2.02 | Stuck together in a hard mass. |
| 78 | 86 | 125 | 2.23 | Stuck together in a hard mass. |
| 85 | 85 | 175 | 2.79 | Set to an extremely hard mass in a few minutes. |

This table is based on a course of procedure in which the resin in question was screened four times in a half hour period to expedite the test. As a result of actual experience under operating conditions with a phenol-formaldehyde resin, it has been found that 80 grains of water vapor per pound of dry air causes no difficulty in the manufacture of abrasive articles and may be regarded as an approximate upper limit for ordinary operations. In other words, the atmosphere is dry with respect to the resin. When the amount of water is above about 80 grains per pound of dry air, the conditions for obtaining a uniform mix are poor and become progressively worse as the moisture content of the atmosphere increases. In such cases, the atmosphere is wet with respect to the resin, and while the amount of water taken up by the resin is small, as may be seen from the table above, it is sufficient, nevertheless, to cause the mixture of resin and abrasive grain to be non-uniform. I have discovered that even though resinous materials, such as phenolic condensation resins, are not hygroscopic in the usual sense, they do absorb a slight amount of water that is sufficient to cause difficulties in the manufacture of abrasive articles therefrom.

If the temperature of the mixing room is kept as low as 60° Fahr., the atmospheric conditions for obtaining a uniform mix are good even if the humidity of the atmosphere approaches the saturation point, but a temperature as low as that is not comfortable for the workmen and it becomes desirable, therefore, to maintain a higher temperature than 60° Fahr. An atmosphere at a temperature higher than 60° Fahr. and saturated, will contain more than 80 grains of water per pound of dry air, and since more cooling of the air precipitates only the water in excess of that required to saturate the atmosphere, it becomes necessary to bring the relative humidity to a point below 100% if the existing atmosphere before cooling contains more than 80 grains of water per pound of dry air.

One way of lowering the humidity and at the same time lowering the temperature comprises the introduction of cold, dry air into the atmosphere in which the manufacture is being carried out. Refrigeration pipes located in the work-room also will serve to lower the humidity as well as to lower the temperature.

While phenol condensation product resins have been mentioned specifically as examples of bonds, my process applies to any bonding material which will absorb water or water vapor from the atmosphere. The same considerations apply where one uses plasticizers or fillers which absorb water from the atmosphere. My process is applicable to a large variety of abrasive materials, a number of which have been mentioned in the introduction of this specification.

I claim:

1. The method of manufacturing abrasive or polishing implements to form a substantially uniform article and prevent segregation of the binder and abrasive, comprising mixing a synthetic resin with an abrasive material in an atmosphere which is conditioned to maintain the temperature below that at which the resin begins to soften and the humidity below that at which the resin takes up water to the extent of forming lumps, molding the resulting mixture under pressure and below said critical temperature, and heating the shaped article to transform the resinous binder.

2. The method of manufacturing abrasive implements and the like to form a substantially uniform article and prevent segregation of the binder and abrasive, comprising commingling abrasive grains with a potentially reactive resin and a reactive aldehyde in an atmosphere which is conditioned to maintain the temperature below that at which the resin begins to soften and the humidity below that at which the resin takes up water to the extent of forming lumps, cold molding the mixture to the desired form and at a temperature below the said critical temperature, and transforming the resinous binder by a subsequent heating operation.

3. The method of manufacturing abrasive or polishing implements to form a substantially uniform article and prevent segregation of the binder and abrasive, comprising mixing a potentially reactive synthetic resin and a plasticizing agent therefor with an abrasive material in an atmosphere which is conditioned to maintain the temperature below that at which the resin begins to soften and the humidity below that at which the resin takes up water to the extent of forming lumps, molding the resulting mixture before the mass has become sticky or tacky, and heating the shaped article to transform the resinous binder.

4. The method of manufacturing abrasive or polishing implements to form a substantially uniform article and prevent segregation of the binder and abrasive, comprising mixing a synthetic resin with an abrasive material in an atmosphere which is conditioned to maintain the temperature below that at which the resin begins to soften and the humidity below that at which the resin takes up water to the extent of forming lumps, molding the resulting mixture under pressure, and heating the shaped article to transform the resinous binder.

5. The method of manufacturing abrasive or polishing implements to form a substantially uniform article and prevent segregation of the binder and abrasive, comprising incorporating a phenolic condensation resin with an abrasive material in a conditioned atmosphere of humidity below 80 grains of water per pound of dry air at a temperature below 80° F., thereby preventing the mass from forming lumps, molding the resulting mixture under pressure, and heating the shaped article to transform the resinous binder.

HARRY C. MARTIN.